United States Patent

Grozev et al.

[11] Patent Number: 5,624,653
[45] Date of Patent: Apr. 29, 1997

[54] METHOD FOR PRODUCING SULPHUR TRIOXIDE

[75] Inventors: Georgy Grozev; Christo Sapundjiev; Dimitry Elenkov, all of Sofia; Dimitry Dimitrov, Plovdiv; Nikola Dobrev, Plovdiv; Ivan Enchev, Plovdiv, all of Bulgaria

[73] Assignees: Institute of Chemical Engineering at Bulgarian Academy of Sciences, Sofia; Works for Non-Ferrous Metals-AD (KCM-S.A.), Plovdiv, both of Bulgaria

[21] Appl. No.: 519,928

[22] Filed: Aug. 28, 1995

[30] Foreign Application Priority Data

Aug. 29, 1994 [BG] Bulgaria .......................... 99008

[51] Int. Cl.$^6$ .......................... C01B 17/74; C01F 1/00
[52] U.S. Cl. .......................... 423/533; 423/522; 422/160
[58] Field of Search .......................... 423/522, 533; 422/160, 161

[56] References Cited

U.S. PATENT DOCUMENTS

| | | | |
|---|---|---|---|
| 3,404,955 | 10/1968 | Drechset et al. | 423/522 |
| 3,620,673 | 11/1971 | Bruwder et al. | 423/522 |
| 4,088,742 | 5/1978 | Homme, Jr. | 423/522 |
| 4,478,808 | 10/1984 | Matros et al. | 423/533 |
| 5,264,200 | 11/1993 | Fellhouse et al. | 423/522 |

FOREIGN PATENT DOCUMENTS

| 1696383 | 12/1991 | U.S.S.R. | 423/533 |
|---|---|---|---|

*Primary Examiner*—Gary P. Straub
*Attorney, Agent, or Firm*—Birch, Stewart, Kolasch & Birch, LLP

[57] ABSTRACT

The method for the production of sulphur trioxide, operating in a non-stationary regime, intend for sulphuric acid production.

The aim of the present invention is to provide a method for the production of $SO_3$ by catalytic oxidation of $SO_2$, contained in an inlet gas flow, providing a stable regime of operation of wide limits of variation of the flow rate and the concentration of $SO_2$ in the input gas.

The essence of the invention is in this, that between the two layers of the first step of oxidation in a two-step three-layer contact apparatus, the gas flow is partially cooled in an inner heat-exchanger-mixer and part of the heat of the reaction of oxidation of $SO_2$ in the first stage of oxidation is passed to the second stage of oxidation by means of the gas flow coming out of the intermediate absorption, containing unoxidized $SO_2$ from the first stage.

8 Claims, 1 Drawing Sheet

METHOD FOR PRODUCING SULPHUR TRIOXIDE

FIELD OF THE INVENTION

The invention relates to a method for the production of sulphur trioxide and particularly to a two-stage catalytic oxidizing of sulphur dioxide, contained in an inlet gas flow, entering a contact apparatus (reactor) which has a stationary catalyst layer, operating in non-stationary conditions, achieved by periodic changes of the direction of the incoming gas flow and an intermediate and final absorption of sulphur trioxide. The invention may find application in chemical industry and non-ferrous metallurgy, particularly in sulphuric acid production.

BACKGROUND OF THE INVENTION

A method of one-stage catalytic oxidation of sulphur dioxide in non-stationary condition is known, where the direction of the incoming reaction mixture, is periodically changed (U.K. Patent No. 208521 (Apr. 28, 1982); USSR Patent No. 994,400 (Feb. 7, 1983); DAS No. 3,050,368 (Jun. 3, 1982); U.S. Pat. No. 4,478,808 (Dec. 24, 1981)).

The comparatively low degree of conversion (90–96%) at sulphur dioxide concentrations above 3 vol. % is a disadvantage of the method.

A method is known for the production of $SO_3$ by a two-stage catalytic oxidation of $SO_2$ and an intermediate absorption of $SO_3$ after the first stage of oxidation, the so called DC/DA (Double Conversion/Double Absorption) method (Bulg. Patent No. 39,528 (Mar. 5, 1985)).

In compliance with the method the first stage of oxidation represents a conventional three-layer reactor of intermediate cooling of the gas flow between the layers, where 90–93% of the $SO_2$ is oxidized to $SO_3$. After cooling of the gas flow, coming out of the first stage, to 150°–180° C. and an intermediate absorption of the obtained $SO_3$, the gas flow of the concentration of 0.7–1.5 vol. % $SO_2$ at the temperature of 50°–70° C. enters the second stage of oxidation. The latter represents a reactor of a stationary layer of catalyst preliminary heated to 450° C., operating in non-stationary conditions that are achieved by periodic changes of the direction of the incoming gas. The obtained $SO_3$ is absorbed in an end absorber.

The first stage of oxidation works in an autothermal regime, i.e. the heat of reaction of the system should be adequate for preheating the incoming gas flow from 50°–70° C. to 400°–450° C. at the entrance of the first catalyst layer of the reactor.

A disadvantage of the above method for $SO_3$ production is that the autothermal regime of operation of the first stage of oxidation is disturbed when the flow rate or the concentration of $SO_2$ in the input gas flow is changed, which gives either insufficient or surplus heat in the system at increase or decrease of $SO_2$ concentration, respectively, which on the other hand requires a substantial reserve of heat-exchange surface.

In another known method for the production of $SO_3$ by a two-stage catalytic oxidation of $SO_2$ the two stages operate in non-stationary conditions achieved by periodic changes of the direction of feeding the input gas flow (Bulg. patent Registration No. 79,942 (May. 29, 1987)). In this method the catalyst layer in the reactor is separated into two equal parts, where after the first layer in which the gas flow enters the reactor flow is cooled in an outer heat-exchanger down to 130°–160° C. and an intermediate absorption of the obtained $SO_3$ in the first stage, takes place. Then the gas flow is preheated up to 250°–350° C. and goes to the second layer of the reactor for after-oxidation of $SO_2$. The obtained $SO_3$ is absorbed in an end absorber.

The disadvantage of this method is that when $SO_2$ concentration decreases to 4 vol. %, it is necessary to increase the inlet temperature in the second stage to 350° C., which is done by partial bypassing of the hot gas flow at the outlet of the first stage of oxidation directly to the second stage, i.e. intermediate absorption. That lowers the overall degree of conversion.

When $SO_2$ concentration is above 8 vol. %, there is a heat surplus in the system, due to which the maximum temperature in the reactor increases and the overall conversion decreases. On the other hand, when the direction of entering of the gas flow to the reactor is changed, the hot and the cold gas flows in the intermediate outer heat-exchanger change their places, i.e. a part of $SO_3$ will not be absorbed, which again lowers the degree of conversion. In the same time, the intermediate absorber should operate in an alternating regime of movement of the gas flow related to sprinkled acid or must have its own system of valves for changing the direction of gas feeding to it, operating in synchronization with that of the reactor.

A common disadvantage of the described methods, as well as of classical DC/DA schemes, is the disturbance of the temperature regime of the system when the flow rate and the concentration of $SO_2$ in the gas flow are changed. Besides, it is not always possible to realize such a degree of conversion, which can guarantee a concentration of less than 0.05 vol. % of $SO_2$ at the outlet of the system.

It is the aim of the present invention to overcome the above mentioned disadvantages and the provide a method for the production $SO_3$ by a two-stage catalytic oxidation of $SO_2$, contained in an inlet gas flow in a contact apparatus (reactor), operating in a non-stationary regime, which is realized by periodic changes of the direction of the gas flow to the reactor and intermediate absorption of $SO_3$, providing a stable regime of operation of wide limits of variation of the flow rate and the concentration of $SO_2$ in the input gas flow as well as lower than 0.05 vol. % $SO_2$ concentration at the outlet of the system.

SUMMARY OF THE INVENTION

The task had been solved by the invention of a method for $SO_3$ production by a two-stage catalytic oxidation of $SO_2$, contained in an inlet flow, in a contact apparatus (reactor), operating in non-stationary conditions and an intermediate absorption of $SO_3$ where the input gas flow is fed alternatively to the first or to the second stationary catalyst layer of the first stage of a two-stage three-layer contact apparatus by the help of a three-way valve for $SO_2$. Between the two layers of the first stage of oxidation the gas flow is partially cooled in an inner heat-exchanger-mixer and the $SO_3$ obtained alternatively from the second, or respectively, or the first layer of the first stage of oxidation is directed by a three-way valve to the intermediate absorber. A part of the heat of the reaction of oxidation of $SO_2$ in the first stage of oxidation is passed to the second stage of oxidation by means of the gas flow coming out of the intermediate absorber which is alternatively fed from the top or from the bottom of the catalyst layer of the second stage of oxidation by the help of a three-way valve for $SO_2$ and the $SO_3$, obtained in the catalyst layer is discharged alternatively from the top or from the bottom of the second stage of oxidation and through a three-way valve for $SO_3$ it goes to the end absorber.

Another feature of the invention is that when the flow rate and the concentration of $SO_2$ changes from 2 to 10 vol. % with the time, the two stages of oxidation of the reactor work together, independent one of the other, while at concentrations of 0.8 to 2.0 vol. % $SO_2$—only one of them is in operation.

Another feature of the invention is that in each stage of oxidation the change of the direction of the gas flow by the three-way valve is independent of the change of direction of the gas flow in the other step of oxidation.

A further feature of the invention is that the change of the direction of the input gas flow in each stage of oxidation is dependent on the temperature of the interface inert material-catalyst of the layers of the two stages.

The advantages of the method of the present invention are in that the two stages of oxidation can operate independent one of the other and in wide range of changes of $SO_2$ concentrations and flow rate at the inlet and the surplus heat of oxidation in the first stage is re-distributed to the second stage of oxidation.

BRIEF DESCRIPTION OF THE DRAWING

The invention will be more clearly described by the help of the examples of its embodiments and the applied figure. The latter represents only one of the examples of embodiment of the invention.

DETAILED DESCRIPTION OF PREFERED EMBODIMENT

Figure 1:
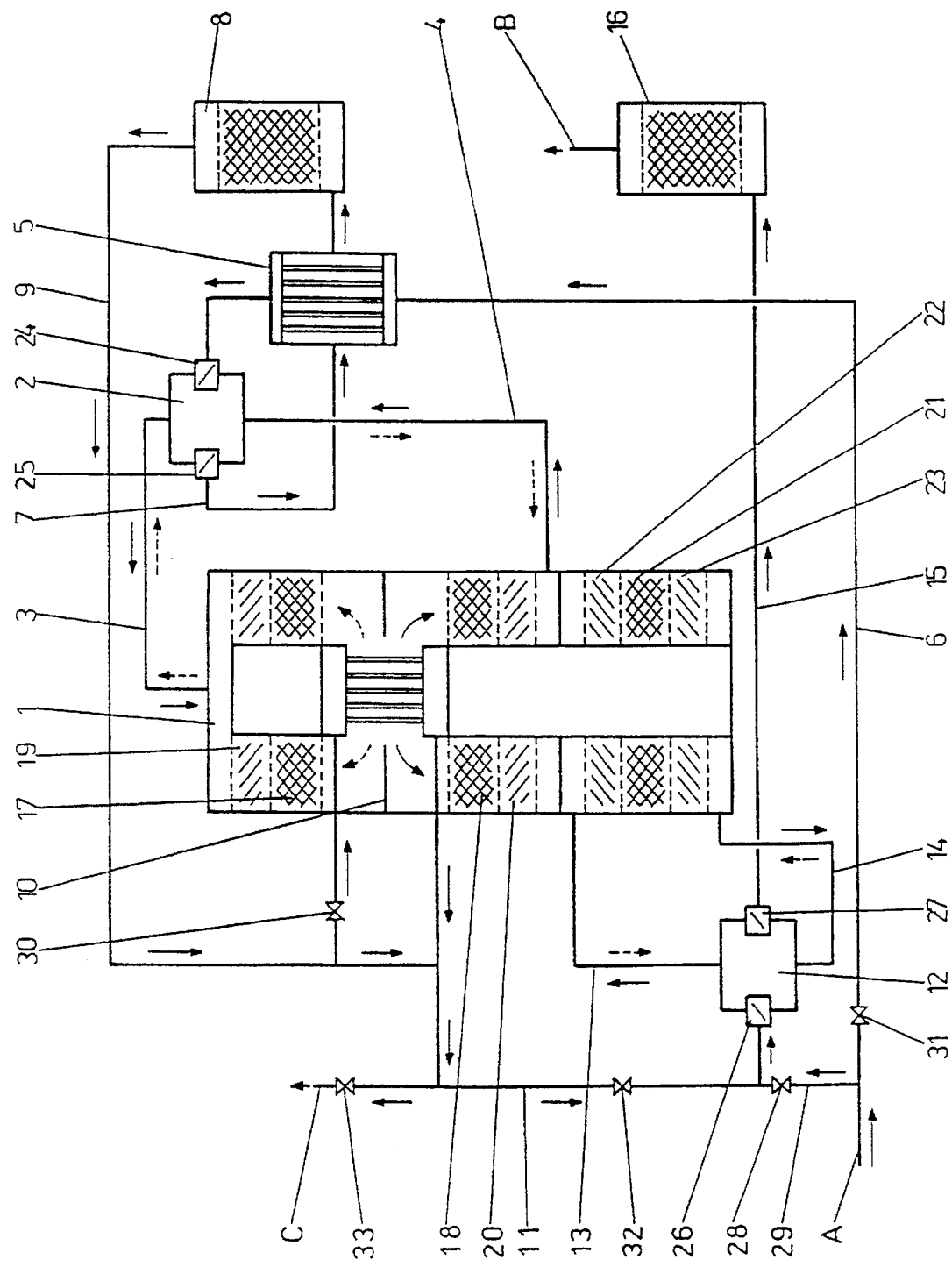

The scheme of the embodiment of the method, according to the invention consists of a reactor (1), a couple of three-way valves (2), which is connected on the one hand to the reactor through the inlet-outlet pipelines (3) and (4) and on the other hand, through the tube space of the heat-exchanger (5) and the main pipeline (6)—to the entrance of system A and by the pipeline (7), through the intertube space of heat-exchanger (5)—to the intermediate absorber (8), the outlet of which is connected by pipeline (9), the tube space of the heat-exchanger-mixer (10), built in the reactor and pipeline (11) to the second couple of three-way valves (12), which are connected at one side to the reactor (1) by the inlet-outlet pipelines (13) and (14) and the other side, by pipeline (15), to the end absorber (16) the outlet of which is the outlet of the scheme.

Reactor (1) is a two-stage one. The first stage consists of: two catalyst layers (17) and (18), located above and under the heat-exchanger-mixer (10), as well as of two layers of inert material (19) and (20), located at the inlet-outlet regions of the first stage.

The second stage includes the catalyst layer (21) and the two layers of inert material (22) and (23), located in the inlet-outlet regions of the second stage.

The change of the direction of feeding of the gas in the first stage of oxidation is carried out by the first couple of three-way valves (2) and the valve (24) for the incoming $SO_2$ gas is used for feeding it from the top though the input-output pipeline (3), or from the bottom by the input-output pipeline (4) to the reactor and by the help of valve (25) for $SO_3$ the outgoing flow is passed from the bottom through the inlet-outlet pipeline (4) or from the top—through the inlet-outlet pipeline (3) and through the intertube space of the heat-exchanger (5) to the intermediate absorber (8).

The change of the direction of feeding the gas in the second stage of oxidation is carried out by a couple of three-way valves (12), where valve (26) for $SO_2$ passes the gas flow from pipeline (11) from the top through the inlet-outlet pipeline (13), or from the bottom through the inlet-outlet pipeline (14) to the reactor and by the valve (27) for $SO_3$, the latter is carried out from the bottom through an inlet-outlet pipeline (14) or from the top through the inlet-outlet pipeline (13) and pipeline (15) to the end absorber (16).

By the help of valve (28) and pipeline (29) a part of the input gas flow may be fed directly to the inlet of the valve for $SO_2$ (26), aiming at providing the concentration of at least 0.8 vol. % $SO_2$ at the inlet of the second stage.

Valve (30) regulates the intermediate cooling of the gas between the catalyst layers (17) and (18) in the heat-exchanger-mixer (10). The two stages of oxidation may be separated completely one from the other and may operate separately depending on the inlet concentration of $SO_2$. There are for the purpose valves (31), (32) and (33). Thus, when valves (28) and (32) are closed and valves (31) and (33) are open—only the first stage of oxidation is used and C is the outlet of the system. When valves (31) and (32) are closed and valve (28) is open, the first stage of oxidation, absorber (8) and heat-exchangers (5) and (10) are switched off the system and only the second stage of oxidation is operating.

The incoming gas flow of the temperature of 50°–70° C. and $SO_2$ concentration 2–10 vol. % enters the system at inlet A of the scheme of FIG. 1. It passes consecutively through valve (31), pipeline(6), the tube space of the heat-exchanger (5) and enter the couple of three-way valves (2), i.e. at the inlet of the $SO_2$ valve (24). By means of the latter and the inlet-outlet pipelines (3) and (4) the gas flow enters alternatively from the top and the bottom of the first stage of oxidation at the temperature of 130°–180° C. Passing through the layer of inert material (19), respectively (20), the gas pre-heats, $SO_2$ oxidizes partially in the catalyst layer (17), respectively (18), cools intermediately in the heat-exchanger-mixer (10), then it additionally oxidizes in catalyst layer (18), respectively (17), and transfers its heat to the inert material layer (20), respectively (19). The output gas flow exits from the bottom/top of the first stage of oxidation through the inlet-outlet pipelines (4), respectively (3) and through $SO_3$ valve (25) and pipeline (7) it goes out through the intertube space of heat-exchanger (5), where it is cooled down to 150° C., to the intermediate absorber (8). The $SO_3$, obtained in the first stage of oxidation is absorbed in the latter.

The output gas flow from absorber (8), containing unoxidized $SO_2$ of the concentration of 0.25–1.5 vol. % and the temperature of 50°–70° C., passing through pipeline (9) and valve (30) enters the tube space of the heat-exchanger-mixer (10), where it is heated to 220°–250° C. and along pipeline (11) and trough valve (32) enters the couple of three-way valves (12), i.e. the $SO_2$ valve (26). In case the $SO_2$ concentration of the gas at inlet of the valve for $SO_2$ (26) is less than 0.8 vol. %, by the opening the valve (28) on pipeline (29) a part of the gas flow, passing through A, is fed directly to the inlet of the $SO_2$ valve (26). By the help of the latter and the inlet-outlet pipelines (13) and (14) the gas flow enters alternatively the second step of oxidation from the top or from the bottom, passing consecutively through the layer of inert material (22), catalyst (21) and the inert material (23), and vice versa, respectively, and $SO_2$ oxidizes to $SO_3$. From the second stage of oxidation the gas flow is passed alternatively from the bottom or from the top through the inlet-outlet pipelines (14) and (13) and through the $SO_3$ valve (27) and pipeline (15) it enters the end absorber (16).

The rest of the SO$_2$, which is not oxidized, is emitted to the atmosphere through the outlet of end absorber (16), i.e. outlet B in the scheme.

In cases where the input SO$_2$ concentration is about 1.5 vol. %, by closing valves (28) and (32) and opening valves (31) and (33) the second stage of oxidation is excluded, i.e. only the first stage of oxidation is operating and C is the outlet of the scheme.

In cases where SO$_2$ concentration is in the range of 0.8–1.0 vol. %, by closing valves (31) and (32) and opening valve (28), the incoming gas flow is fed directly to SO$_2$ valve (26) of second stage, i.e. the first stage is excluded from the scheme. In both cases SO$_2$ concentration at the outlet of the system is less than 0.05 vol. %.

The change of direction of feeding the gas flow in both stages is carried out independently one of the other and is dependent only on the temperature of the interface inert material-catalyst, i.e. (19)–(17), respectively (20)–(18) for the first stage and (22)–(21), respectively (21)–(23) for the second stage of oxidation.

The advantages of the invention are illustrated by the following examples:

EXAMPLE 1

At SO$_2$ concentration in the input gas flow of 9 vol. % and temperature 60°–80° C. the following temperature regime, conversion and intermediate concentrations are obtained:

The gas flow, entering the system through pipeline (6) in the tube space of the heat-exchanger (5), is preheated up to 130°–180° C., cooling to 150° C. the reacted gas, entering the intermediate absorber (8). By means of the three-way valve (24) for SO$_2$, the gas flow is directed alternatively from the top or from the bottom at the first stage of oxidation in reactor (1). The directions of movement of the gas are marked by arrows. After a partial oxidation of SO$_2$ in the first catalyst layer (17) in which the gas flow enters and intermediate cooling down to 400°–420° C. in the heat-exchanger-mixer (10) by the gas flow, going out of the intermediate absorption, the gas enters the second catalyst layer (18). Cooling is regulated by valve (30) and is controlled by the temperature of the gas going out of the heat-exchanger-mixer (10). The conversion in the first stage is 86.5% and the maximum temperature reaches 540°–560° C.

The reacted gas of an average in time temperature of 220°–250° C. at the outlet of the first stage enters the intermediate absorber (8) through SO$_3$ valve (25), pipeline (7) and the intertube space of the heat-exchanger (5), where it is cooled to 150° C. The obtained SO$_3$ is absorbed in absorber (8).

After the absorption the gas flow of SO$_2$ concentration of 1.376 vol. %, trough pipeline (9), enters the tube space of the heat-exchanger-mixer (10), where it is preheated from 50°–70° C. to 220°–250° C. and through valve (32), pipeline (11), it goes to the inlet of the three-way valve for SO$_2$ (26) of the second stage of oxidation. Valve (26) directs the flow alternatively from the top or from the bottom in the second stage in reactor (1) through the inlet-outlet pipelines (13) and (14) to inert material layer (22), catalyst (21) and inert material (23), where 96.5% of SO$_2$ is oxidized to SO$_3$. The gas flow is taken out of the reactor from the top or from the bottom by the inlet-outlet pipelines (13) and (14) and through the SO$_3$ valve (27) and pipeline (15) it enters the end absorber (16), where SO$_3$ obtained in the second stage of oxidation, is absorbed. The SO$_2$ concentration at the outlet of end absorber (16) is 0.049 vol. %. Changing over of the directions of feeding of the gas in both stages is carried out independently one of the other by the help of the three-way valves allowing the change to be realized for about 3–6 seconds. The interval of switching may be different and is controlled by the temperature of the interfaces inert-catalyst in both stages.

EXAMPLE 2

This example is analogous to Example 1 differing in that SO$_2$ concentration at the inlet is 5.0 vol. % In this case, after the oxidation in the first stage the gas flow at the outlet of the intermediate absorber will contain 0.722 vol. % SO$_2$. In order to reach SO$_2$ concentration of 0.8 vol. % at the inlet of second stage, 1.71% of gas flow, entering the system, is added through valve (28) on pipeline (29). After reacting in the second stage and absorption of SO$_3$ in the end absorber (16), the SO$_2$ concentration at the outlet of absorber (16) will be 0.028 vol. %.

EXAMPLE 3

This example is analogous to Example 1, differing in that SO$_2$ concentration at the inlet is 2.0 vol. %. Intermediate cooling is excluded by closing valve (30). In this case SO$_2$ concentration at the outlet of absorber (8) will be 0.277 vol. % and to achieved the inlet concentration of 0.8 vol. % in the second stage, it is necessary to add 29.79% of the inlet gas flow through valve (28).

EXAMPLE 4

This example is analogous to Example 1, differing in that SO$_2$ concentration at the inlet is 1.0 vol. %. In this case by closing valves (31) and (32) the first stage of reactor (1), absorber (8) and the heat-exchangers (5) and (10) are excluded and only the second stage of oxidation is in operation. The gas, through valve (28) and (26), is passed directly to the second stage of oxidation. After absorber (16) the gas will contain 0.036 vol. % SO$_2$.

EXAMPLE 5

This example is analogous to Example 3, differing in that SO$_2$ concentration at the inlet is 1.5 vol. %. By closing valves (28) and (32) and opening valve (33) only the first stage of reactor (1) is used, i.e. its second stage is excluded. The gas flow enters reactor (1) through valve (31), pipeline (15), heat-exchanger (5) and SO$_2$ valve (25) and after consecutive oxidation in both catalyst layer and total conversion of 97% and SO$_3$ absorption in absorber (8), it goes out through valve (33) to atmosphere, containing 0.046 vol. % SO$_2$.

EXAMPLE 6

This example is analogous to Example 2, differing in that the gas flow rate in the system has increased by 30%. As a result of that the degree of conversion in the first stage of oxidation will decrease from 86.5 to 83.5%, while SO$_2$ concentration in the gas flow will be 0.88 vol. %. After 05.5% oxidation of SO$_2$ in the second stage, its concentration at the outlet of end absorber (16) will be 0.04 vol. %.

We claim:

1. A method for producing SO$_3$ by a two-stage catalytic oxidation of SO$_2$, contained in a gas flow fed to a two-stage three-layer contacting apparatus, said gas flow having an SO$_2$ content of 1 to 10%, which SO$_2$ content varies in a non stable manner and with intermediate absorption of SO$_3$, the process comprising the following oxidation stages;

Stage 1:
- A) providing a first catalyst stage containing a first and a second stationary separate layers of catalyst, and
- B) alternatively feeding said incoming $SO_2$ gas flow to the first or the second layer of the stationary catalyst, by means of a three-way $SO_2$ valve, partially cooling the gas flow in an inner heat-exchanger-mixer that is located between the two stationary catalyst layers of the first stage of the contact apparatus, and then through the other stage, said feeding alternating in response to the temperature change in the catalyst, directing the gas flow obtained alternatively from the second or the first catalyst layer of the first stage to an intermediate absorber by means of a three-way $SO_3$ valve, and transferring a part of the reaction heat of $SO_2$ oxidation from the first stage of oxidation to the second stage of oxidation by heating in said inner heat exchanger-mixer the gas flow, from the intermediate absorber; and Stage 2:
feeding the gas flow containing unoxidized $SO_2$ from the intermediate absorber via the heat exchanger-mixer or directly to the top/bottom to a third catalyst layer that is located in the second stage of the contact apparatus by means of a three-way $SO_2$ valve, and transferring $SO_3$ obtained in the third catalyst layer alternatively from the bottom/top of the third catalyst layer to a final (end) absorber by means of three-way $SO_3$ valve.

2. A method according to claim 1, characterized in that the two-stages of oxidation of the contact apparatus operate jointly and independently one of the other when the $SO_2$ flow rate changes with time and $SO_2$ concentration changes from 2 to 10 vol. %.

3. A method according to claim 2, characterized in that a change in the alternation of the feeding of the gas flow in each stage of oxidation depends on the temperature at an interface between an inert material and the catalyst of the catalyst layers of the two stages.

4. A method according to claim 2, characterized in that the alternation of the feeding of the incoming gas flow in each stage of oxidation is independent of the alternation of the feeding of the incoming gas flow in the other stage of oxidation.

5. A method according to claim 4, characterized in that a change in the alternation of the feeding of the gas flow in each stage of oxidation depends on the temperature at an interface between an inert material and the catalyst of the catalyst layers of the two stages.

6. A method according to claim 1, characterized in that the alternation of the feeding of the incoming gas flow in each stage of oxidation is independent of the alternation of the feeding of the incoming gas flow in the other stage of oxidation.

7. A method according to claim 6, characterized in that a change in the alternation of the feeding of the gas flow in each stage of oxidation depends on the temperature at an interface between an inert material and the catalyst of the catalyst layers of the two stages.

8. A method according to claim 1, wherein each catalytic layer consists of an layer of catalytic material and an inert material, characterized in that the alternation of the feeding of the gas flow in each stage of oxidation depends on the temperature at an interface between the inert material and the catalyst of the catalyst layers of the two stages.

* * * * *